United States Patent

Fulkerson

[15] 3,700,924

[45] Oct. 24, 1972

[54] DIFFERENTIAL SNAP ACTING SWITCHING CIRCUIT

[72] Inventor: David E. Fulkerson, Minnetonka, Minn.

[73] Assignee: Honeywell Inc., Minneapolis, Minn.

[22] Filed: Feb. 7, 1972

[21] Appl. No.: 223,927

Related U.S. Application Data

[63] Continuation-in-part of Ser. No. 58,326, July 27, 1970, abandoned.

[52] U.S. Cl.....................................307/255, 307/303

[51] Int. Cl...............................................H03k 17/00

[58] Field of Search......307/252, 254, 255, 303–305, 307/288

[56] References Cited

UNITED STATES PATENTS

| | | | |
|---|---|---|---|
| 2,770,732 | 11/1956 | Chong | 307/288 |
| 2,901,639 | 8/1959 | Woll | 307/288 |
| 3,233,125 | 2/1966 | Buie | 307/215 |
| 3,376,516 | 4/1968 | Budts | 307/255 |
| 3,409,786 | 11/1968 | Nemeth | 307/288 |
| 3,466,469 | 9/1969 | Brown | 307/255 |
| 3,489,922 | 1/1970 | Lee | 307/288 |
| 3,534,245 | 10/1970 | Limberg | 307/297 |
| 3,544,817 | 12/1970 | Thiele | 307/288 |
| 3,555,306 | 1/1971 | Cogar | 307/255 |
| 3,569,740 | 3/1971 | Avins | 307/237 |

*Primary Examiner*—Herman Karl Saalbach
*Assistant Examiner*—R. E. Hart
*Attorney*—Lamont B. Koontz et al.

[57] ABSTRACT

A snap-acting switching circuit having a temperature independent threshold switching voltage contains a pair of complementary transistors forming a regenerative feedback loop and a differential pair of transistors connected in one of the branches of the feedback loop to control the gain of the loop by a differential voltage.

20 Claims, 9 Drawing Figures

INVENTOR.
DAVID E. FULKERSON
BY Osmund R. Dahle
ATTORNEY.

INVENTOR.
DAVID E. FULKERSON
BY Osmund R. Dahl
ATTORNEY.

DIFFERENTIAL SNAP ACTING SWITCHING CIRCUIT

REFERENCE TO RELATED APPLICATIONS

This application is a continuation-in-part of my copending application Ser. No. 58,326 filed July 27, 1970, entitled DIFFERENTIAL SNAP-ACTING SWITCHING CIRCUIT, and assigned to the same assignee as the present application.

BACKGROUND OF THE INVENTION

The silicon controlled rectifier is a four-layer semiconductor negative resistance device useful in a variety of switching circuits including relaxation oscillators. In general, the silicon controlled rectifier behaves like two complementary transistors in a regenerative feedback configuration, FIG. 1. The current gain G of the feedback loop is $G = \beta_1 \beta_2$ where $\beta_1$ and $\beta_2$ are the common emitter current gains of the PNP transistor Q1 and the NPN transistor Q2 respectively. The emitter of Q1 forms the anode of the silicon controlled rectifier, the emitter of Q2 forms the cathode, and the base of either Q1 or Q2 is the gate. In the following discussion, the base of Q2 will be considered as the gate of the silicon controlled rectifier, although the base of Q1 could be used as well.

If the loop gain G is less than one, Q1 and Q2 are turned off and the device is said to be in its "forward-blocking" or "off" state. If, on the other hand, G is greater than or equal to unity, the base current of Q2 is multiplied by $\beta_2$ and becomes the base current for Q1. After being multiplied by $\beta_1$, it reinforces the initial base current of Q2. Since the reinforcing current exceeds the initial base current, the current builds up regeneratively, driving both transistors into saturation. $\beta_2$ is a function of the emitter to base voltage $V_{EB2}$ of transistor Q2, and therefore the device can be triggered from the "off" state to the "on" state by increasing $V_{EB2}$ to a value at which the loop gain is greater than or equal to unity.

One disadvantage of the silicon controlled rectifier is that a PN junction voltage drop, $V_j$, must be exceeded to trigger the device. Since $V_j$ is dependent upon temperature, the threshold voltage at which the device switches is also temperature dependent.

A relaxation oscillator is a circuit which is useful in timing circuits, pulse generators, trigger circuits and sawtooth wave generators. An RC charging network is connected to the input terminal of the negative resistance device, such as a unijunction transistor, FIG. 2, so that the capacitor charges up to a certain predetermined voltage, the device turns on, and the capacitor discharges, whereupon the cycle repeats itself. The period of oscillation of the relaxation oscillator is $$t_p = RC \ln (V - V_v/V - V_p)$$

where $V_v$, the valley voltage, is the voltage at which the capacitor begins charging, V is the supply voltage, and $V_p$ is the threshold voltage at which the capacitor is discharged.

The unijunction transistor conducts when the voltage at the input terminal, called the emitter, is a PN voltage drop $V_j$ above the reference voltage, $V_1$, which is established by voltage division determined by the intrinsic stand-off ratio, $$\eta = R_1/R_1 + R_2,$$

of the internal resistances R1 and R2.

An equivalent circuit for the unijunction transistor is shown in FIG. 3. It can be seen that for the unijunction transistor $$V_p = \eta V + V_j.$$

Since $t_p$ is independent of variations in supply voltage V only if both $V_v$ and $V_p$ are proportional to V, $t_p$ is dependent upon supply voltage for a relaxation oscillator employing a unijunction transistor. Furthermore, because $V_j$ is strongly dependent on temperature, $V_p$ and $t_p$ are also dependent upon temperature.

To reduce the variation in $t_p$ caused by changes in temperature and supply voltage, the silicon controlled rectifier or its two-transistor analog sometimes replaces the unijunction transistor as the negative resistance device, FIG. 4. The gain of the feedback loop G is controlled by the emitter-base voltage of one of the transistors. When $V_E$ exceeds $\eta V$ by a junction voltage drop $V_j$, G exceeds unity and the device suddenly conducts, discharging C and starting the cycle again.

Just as in the unijunction transistor, the peak voltage of the silicon controlled rectifier circuit of FIG. 4 is $V_p = \eta V + V_j$ and the model for the unijunction transistor, FIG. 3, applies to the silicon controlled rectifier circuit of FIG. 4 as well. While some improvement in the performance of the relaxation oscillator is achieved by use of the silicon controlled rectifier due to the closer tolerances which can be obtained in fabrication of the silicon controlled rectifier, $t_p$ is still dependent upon temperature and supply voltage.

SUMMARY OF THE INVENTION

The differential snap-acting circuit controls the gain of a regenerative feedback loop with a differential voltage, rather than a junction voltage drop. For this reason, the differential snap-acting circuit has a turn on voltage which is much less temperature dependent than that of the silicon controlled rectifier, and when used in a relaxation oscillator circuit it has peak and valley voltages which are much less dependent on temperature and supply voltages than the prior art snap-acting circuits.

BRIEF DESCRIPTION OF THE DRAWINGS

FIG. 1 schematically shows an equivalent circuit model of a silicon controlled rectifier;

FIG. 2 shows a relaxation oscillator circuit employing a unijunction transistor as the negative resistance device;

FIG. 3 shows an equivalent circuit model of the unijunction transistor;

FIG. 4 shows a relaxation oscillator employing a silicon controlled rectifier as the negative resistance device;

DESCRIPTION OF THE PREFERRED EMBODIMENTS

Figure 5:
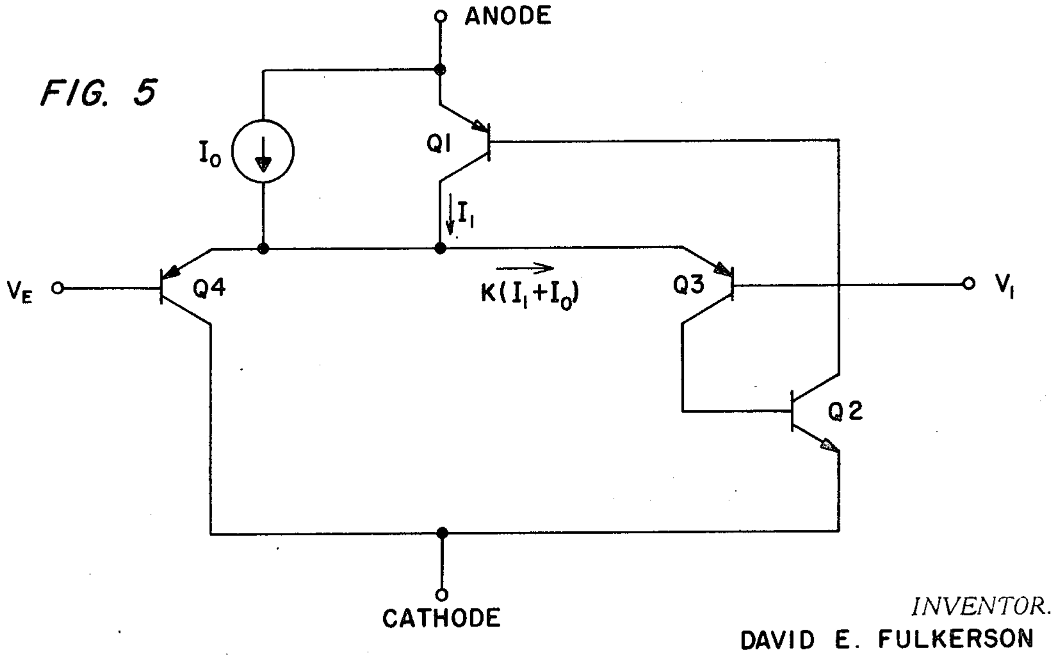
FIG. 5 shows a first embodiment of the present invention.

FIG. 5 shows a snap-acting circuit formed from a complementary pair of transistors Q1 and Q2 having their emitters comprising the anode and cathode terminals of the circuit, respectively. In one branch of the feedback loop, the collector of Q1 is connected to the emitters of a differential pair of transistors Q3 and Q4. The collector of one of the transistors Q3 is connected to the base of Q2, thereby completing the feedback loop. The reference voltage V1 is applied to the base of Q3 and the input signal $V_E$ to the device is applied to the base of Q4. The gain of the feedback loop formed by Q1, Q2 and Q3 is $G = K\,\beta 1\,\alpha 2\,\alpha 3$, where K is the fraction of current $I_1 + I_0$, which flows to the emitter of Q3 and $\alpha 3$ is the emitter to collector current gain of Q3. A current source, which can be a resistor or a transistor circuit, provides a small bias current $I_0$ to the emitters of Q3 and Q4.

If $V_E$ is less than $V_1$, Q4 is turned on and Q3 is turned off. Consequently Q1 and Q2 are also turned off, and $I_1$ consists of the cutoff current, $I_{CO1}$, of Q1. Since Q4 is turned on and Q3 turned off, all of current $I_1$ flows through transistor Q4. As $V_E$ approaches $V_1$, Q3 begins to conduct slightly and $I_1$ is split between Q3 and Q4, with most of the current still flowing through Q4. At this point, Q1 and Q2 begin to conduct slightly. However, since $V_E$ is less than $V_1$, most of $I_1$ flows through Q4, "K" is small, and the gain of the feedback loop is less than unity. As $V_E$ increases, more and more of $I_1$ flows through Q3, until the gain of the feedback loop equals unity. At this point, there is positive feedback and the current $I_1$ increases until either Q1, Q2 or Q3 is driven into saturation. The feedback loop remains in a conducting state until $V_E$ is reduced to a value for which the gain of the feedback loop is less than unity, due to the reduction in the value of "K".

When the feedback loop is turned off, $I_1$ is very small. Although the leakage currents of the transistors forming the feedback loop might provide ample bias current to allow the circuit to be "self-starting", current source $I_0$ provides an additional bias current of a few micro amps to the emitters of Q3 and Q4 to insure that the circuit is "self-starting".

One advantage of the snap-acting switching circuit of the present invention over prior art switching circuits is that the threshold voltage at which the circuit switches is approximately equal to the reference voltage, rather than being one junction voltage greater than the reference voltage. If the present invention comprises an integrated circuit, Q3 and Q4 are matched transistors located very close to one another on the integrated chip, and therefore any variation in the base to emitter voltage of Q3 due to temperature changes is compensated by an identical variation in the base to emitter voltage of Q4. It can be seen that the threshold voltage of the switching circuit of the present invention is nearly independent of temperature.

Figure 6:
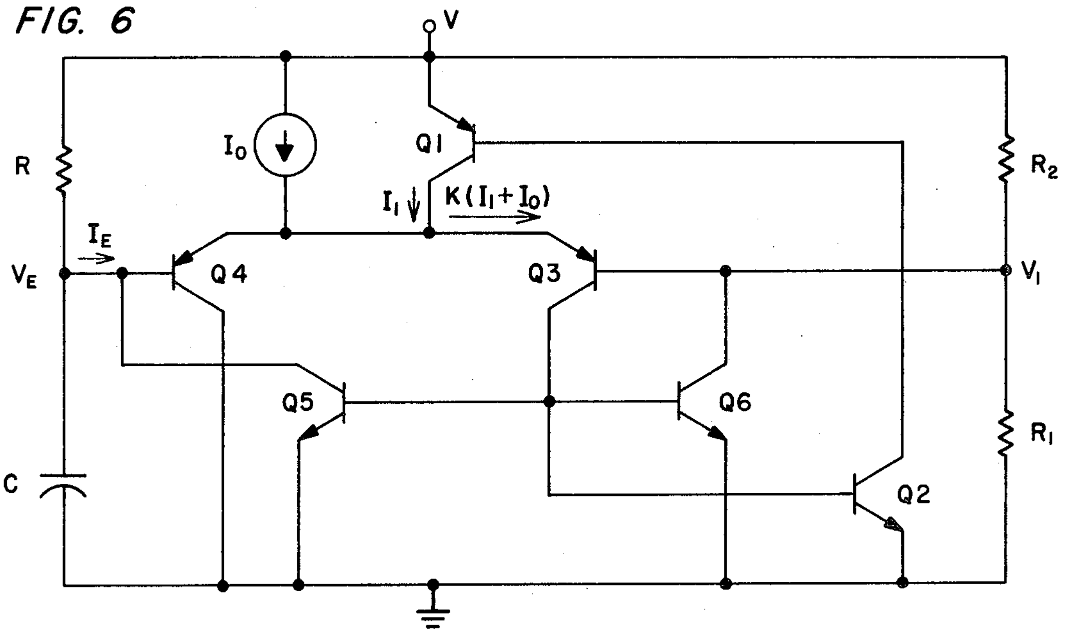
FIG. 6 shows a relaxation oscillator employing a second embodiment of the present invention.

A relaxation oscillator, FIG. 6, is formed from the basic structure shown in FIG. 5 by connecting an RC charging network R and C to the base of Q4, and applying the reference potential to the base of Q3 by means of resistors R1 and R2. Also provided are transistors Q5 and Q6, which have their bases and emitters connected to the base and emitter of Q2, respectively. The collector of Q5 is connected to the base of Q4 while the collector of Q6 is connected to the base of Q3.

The operation of the relaxation oscillator differs from that of the first embodiment of the invention in that upon reaching the threshold voltage, $V_E$ must decrease while $I_E$ increases to allow the capacitor to discharge. When the threshold of the switch is reached $V_E$ equals $V_1$, and the voltage on the emitters of Q3 and Q4 is one PN junction voltage drop greater than $V_1$ or $V_E$. It can be seen that once $V_E$ equals $V_1$, $V_E$ cannot be reached unless $V_1$ is reduced. Transistor Q6 is provided to reduce $V_1$, and therefore $V_E$, as the feedback loop attains the conductive state. Transistor Q5 provides a current path by which the capacitor C can be discharged. If Q5 is not provided, $I_E$ is small and consists of the base current of Q4, which is in the opposite direction of the desired current flow. Without Q5, capacitor C cannot be discharged and therefore $V_E$ cannot be reduced.

Figure 1:
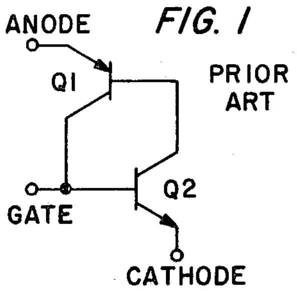
FIGS. 1–4 show prior art snap-acting circuits as follows.
Figure 2:
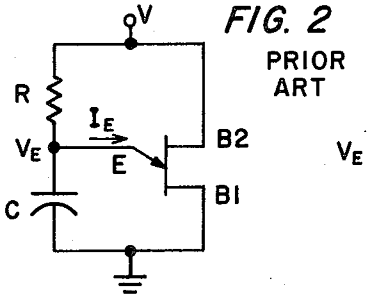
Figure 3:
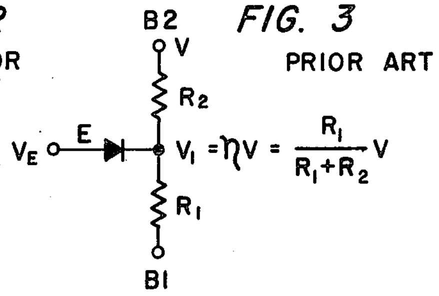
Figure 4:
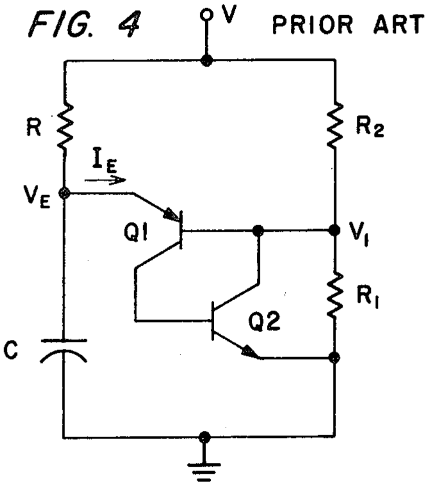
Figure 7:
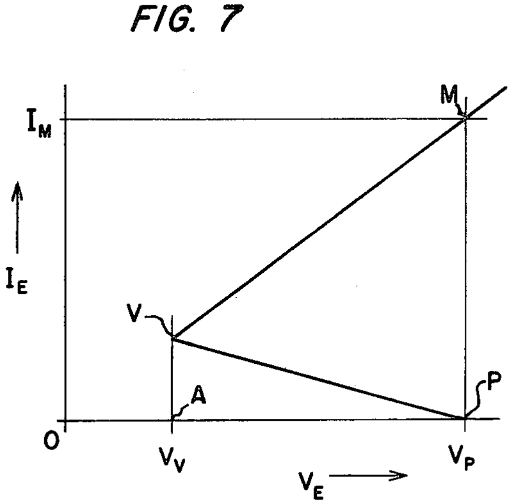
FIG. 7 graphically shows the input voltage - input current characteristic of the second embodiment of the present invention.

If transistors Q2, Q5 and Q6 are matched transistors and are actively biased, the collector current of Q3 is split evenly between the three transistors, since they have common base and emitter terminals. The gain G of the feedback loop is the $G = K\,\beta 1\,\beta 2\,\alpha 3/3$. The condition $G = 1$ corresponds to the "negative resistance" portion line PV, of the voltage-current characteristic of the circuit shown in FIG. 7. The circuit formed by Q2, Q5 and Q6 represents a novel means for detecting when a transistor, either Q5 or Q6, begins to saturate due to $V_E$ and $V_1$ being reduced. Q2 will not saturate because its collector is at a sufficiently high potential. When either Q5 or Q6 starts to saturate, it takes more base current than Q2 in order to maintain the same base-emitter voltage. Since the collector current of Q2, and therefore the loop gain G, is dependent on the relative base currents of Q2, Q5 and Q6, a reduction of the base current of Q2 reduces G to less than unity, thereby terminating the negative resistance portion at the valley point V.

In operation, the capacitor C charges up until $V_E$ is very close to $V_1$. This corresponds to line OP on the voltage-current characteristic shown in FIG. 7. When $V_E$ reaches the peak voltage, $V_p$, the gain of the feedback loop is equal to unity and Q1, Q2, Q3, Q5 and Q6 are turned on, as discussed previously. When Q5 is turned on, a current is provided to discharge capacitor C, and since the voltage across the capacitor cannot change instantaneously, current $I_E$ increases from approximately zero to a current $I_M$ represented by point M in FIG. 7. The capacitor discharges through Q5 until Q5 is no longer saturated, as represented by the valley point V in FIG. 7. At that instant, the voltage across C once again cannot change instantaneously, and the current decreases to a point A in FIG. 7 and the cycle begins again.

Figure 8:
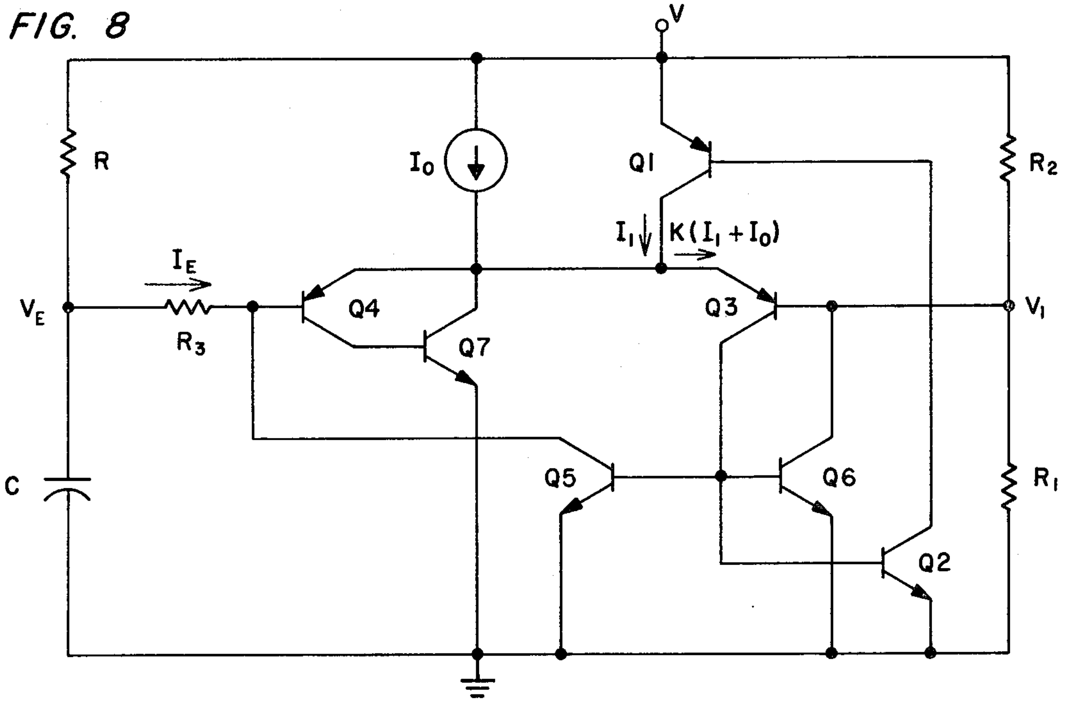
FIG. 8 shows a third embodiment of the present invention.

Referring to FIG. 8, a relaxation oscillator is shown which is similar to that shown in FIG. 6, but which additionally includes resistor R3 and transistor Q7, which is connected so as to amplify the collector current of Q4. R3 is connected between the base of Q4 and the RC network. If R3 is much larger than the saturation resistance of Q5, it can be shown that the valley voltage $V_v$ is proportional to the supply voltage V. Furthermore, if the circuit is an integrated circuit and resistors R1, R2 and R3 are diffused resistors in the integrated chip, $V_v$ is nearly independent of temperature. Generally, the RC network is not part of the integrated structure since it is desirable to be able to select $t_p$.

Since $V_p$ is nearly equal to $\eta V$, $V_p$ is also proportional to V and temperature independent. Therefore, $t_p$, the period of oscillation of the relaxation oscillator, is independent of temperature and supply voltage.

Figure 9:
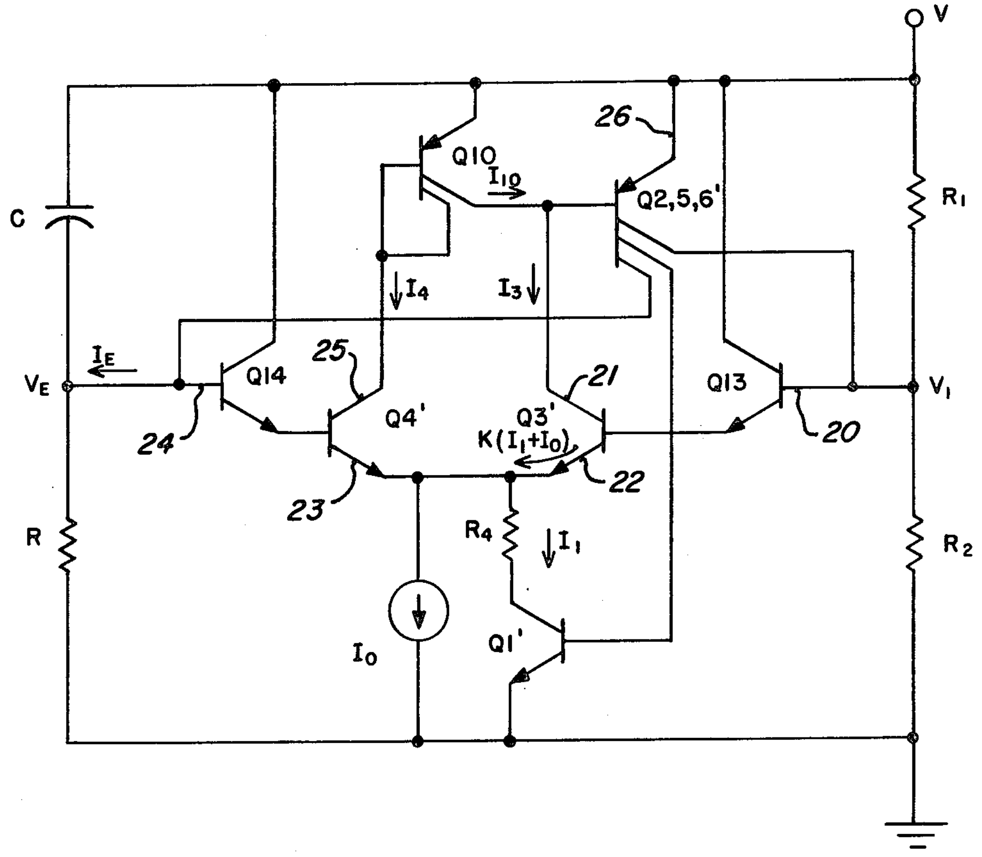
FIG. 9 shows an embodiment of the present invention including a unity gain transistor.

FIG. 9 shows another particularly useful embodiment of the present invention. The circuit of FIG. 9 is similar to the circuits shown in FIGS. 5, 6, and 8, except that transistors of the opposite conductivity type are used. The transistors having a similar circuit function but being of opposite conductivity type are designated with a prime ('). For example, transistor Q1' of FIG. 9 performs a similar function to transistor Q1 of FIG. 5.

It should be noted that several modifications have been made in the circuit of FIG. 9. For example, transistors Q2, Q5, and Q6 of FIG. 6 are replaced by a multiple collector transistor which is designated Q2, 5,6'.

In addition to the differential pair of transistors Q3' and Q4', transistors Q13 and Q14 are provided. Transistors Q3' and Q13 are connected in the well known emitter-follower configuration and may be considered as comprising third transistor means having its base electrode 20 connected to the reference voltage terminal, its collector electrode 21 connected to the base electrode of multiple collector transistor Q2, 5,6' and its emitter electrode 22 connected to the emitter electrode 23 of the fourth transistor means comprising Q4' and Q14.

The fourth transistor means comprising Q4' and Q14 has its base electrode 24 connected to the input voltage terminal. In the embodiments of the present invention shown in FIGS. 5, 6, and 8, the fourth transistor means has its collector electrode connected directly to the emitter electrode of transistor Q2. In the circuit of FIG. 9, the collector electrode 25 of the fourth transistor means is conductively connected to the emitter electrode 26 of multiple collector transistor Q2,5,6', the connection being made through the base-emitter of unity gain transistor Q10. The emitter electrode of unity gain transistor Q10 is connected to the emitter electrode 26 of multiple collector transistor Q2,5,6'.

As shown in FIG. 9, transistor Q10 has two collector electrodes. One collector electrode is connected to the base electrode of transistor Q10, thereby causing transistor Q10 to have unity gain when operated in the active mode of operation. The other collector electrode of transistor Q10 is connected to the base electrode of transistor Q2,5,6'.

Resistor R4 is connected between the emitter electrode of transistor Q3' and the collector electrode of transistor Q1' to limit current $I_1$.

When the circuit of FIG. 9 is initially turned on, input voltage $V_E$ is essentially equal to supply voltage V. At this point, transistors Q4' and Q14 are turned on while transistors Q1', Q3', Q13, and Q2,5,6' are turned off. Transistor Q10 is in saturation. Since transistor Q3' is turned off, current $I_3$ is zero. Therefore, current $I_{10}$ is also essentially zero.

As capacitor C begins to charge, voltage $V_E$ is reduced toward reference voltage $V_1$. Transistor Q3' begins to turn on and the current $I_o$ is split between $I_3$ and $I_4$. Current $I_{10}$ is equal to and limited to current $I_3$ and therefore the base current of transistor Q2,5,6' is zero. Therefore transistors Q1' and Q2,5,6' are still turned off. It can be seen that as long as current $I_4$ is greater than current $I_{10}$, transistor Q10 is in saturation. As will be seen, transistor Q2,5,6' is turned off so long as transistor Q10 is in saturation.

When $V_E$ equals $V_1$, currents $I_3$, $I_4$ and $I_{10}$ are all equal. Since $I_{10}$ equals $I_3$, the base current of transistor Q2,5,6' is zero and transistors Q1' and Q2,5,6' are still turned off.

As $V_E$ becomes slightly less positive than $V_1$, the conduction of $Q_4'$ is decreasing as the conduction of $Q_3'$ is increasing and $I_3$ becomes greater than $I_4$. Transistor Q10 now becomes biased in the active region rather than in saturation, and since Q10 has unity gain in the active region, $I_{10}$ equals $I_4$. Therefore, $I_{10}$ is less than $I_3$, turning transistor Q2,5,6' on as base current begins to flow to supply the balance of $I_3$. The regenerative feedback loop of Q1' and Q2,5,6' is in the conducting state. Capacitor C is discharged in the manner described with reference to FIG. 6 and the cycle begins again.

The addition of transistor Q10 provides an extremely well defined switching point in the circuit of FIG. 9. In addition, it has been found that the relaxation oscillator of FIG. 9 can operate with very large values of resistance R without suffering "lock up", which is the failure to oscillate. Typical relaxation oscillator circuits utilizing a unijunction transistor will lock up if the value of R is greater than about 1.2 megohms. It has been found that the circuit of FIG. 9 continues to oscillate at values of R in excess of 16 megohms.

While this invention has been disclosed with particular reference to the preferred embodiments, it will be understood by those skilled in the art that changes in form and detail may be made without departing from the spirit and scope of the invention. For example, transistors Q3 and Q4 can be located in the other branch of the feedback loop between the base of Q1 and the collector of Q2.

The embodiments of the invention in which an exclusive property or right is claimed are defined as follows:

1. A solid state switching circuit comprising:
   - a pair of complementary first and second transistors, interconnected to form a regenerative feedback loop having first and second branches connecting the collector electrodes of said first and second transistors, respectively, to the base electrode of the other of said transistors,
   - controllable impedance means in one of said branches to control the gain of said regenerative loop, said means comprising:
     - third and fourth transistor means having their emitter electrodes connected together, the emitter and collector electrodes of said third transistor means forming part of one of said branches,
   - a voltage division network comprising first and second resistors connected to the base electrode of said third transistor means for applying a reference voltage thereto,
   - an input terminal connected to the base electrode of said fourth transistor means for receiving an input signal voltage, and
   - a current source which provides current to the emitter electrodes of said third and fourth transistor means.

2. The circuit of claim 1 wherein said first transistor is a PNP transistor and said second transistor is an NPN transistor.

3. The circuit of claim 1 wherein said third and fourth transistors means are PNP transistors.

4. The circuit of claim 1 wherein said emitter electrodes of said third and fourth transistor means are connected to the collector electrode of said first transistor, and the collector electrode of said third transistor is connected to the base electrode of said second transistor.

5. The circuit of claim 1 wherein said circuit is an integrated circuit and said first and second resistors are diffused resistors.

6. The circuit of claim 1 wherein said circuit further includes fifth and sixth transistors having their base electrodes connected to the base electrode of said second transistor and their emitter electrodes connected to the emitter electrode of said second transistor, the collector electrode of said fifth transistor connected to the base electrode of said fourth transistor means, and the collector electrode of said sixth transistor connected to the base electrode of said third transistor means.

7. The circuit of claim 6 wherein said input signal voltage is supplied by an RC network connected to said input terminal.

8. The circuit of claim 6 wherein said circuit further includes a third resistor connecting said input terminal and said base electrode of said fourth transistor means, said third resistor being larger than the saturation resistance of said fifth transistor.

9. The circuit of claim 8 wherein said circuit is an integrated circuit and said first, second and third resistors are diffused resistors.

10. The circuit of claim 6 and further comprising unity gain transistor means having a base electrode, an emitter electrode, and a first collector electrode, the base electrode being connected to the collector electrode of said fourth transistor means, the emitter electrode being connected to the emitter electrode of said second transistor, and the first collector electrode being connected to the base electrode of said second transistor.

11. The circuit of claim 10 wherein the unity gain transistor means further includes a second collector electrode, the second collector electrode being connected to the base electrode of said unity gain transistor means.

12. A solid state switching circuit comprising:

a pair of complementary first and second transistors, interconnected to form a regenerative feedback loop having first and second branches connecting the collector electrodes of each of said first and second transistors, respectively, to the base electrode of the other of said first and second transistors, controllable impedance means in one of the branches to control the gain of the regenerative loop, the controllable impedance means comprising: third and fourth transistor means having their emitter electrodes connected together, and having their base electrodes connected to first and second terminals, respectively, the emitter and collector electrodes of said third transistor means forming part of one of the branches, and the collector electrode of said fourth transistor means being connected to the emitter of said second transistor means, and a current source which provides current to the emitter electrodes of said third and fourth transistor means.

13. The circuit of claim 12 and further comprising a voltage division network comprising first and second resistors connected to the first terminal for applying a reference voltage thereto.

14. The circuit of claim 12 and further comprising fifth and sixth transistors having their base electrodes connected to the base electrode of said second transistor and having their emitter electrodes connected to the emitter electrode of said second transistor, the collector electrode of said fifth transistor connected to the base electrode of said fourth transistor means, and the collector electrode of said sixth transistor connected to the base electrode of said third transistor means.

15. The circuit of claim 14 wherein said second transistor, fifth transistor, and sixth transistor comprise multiple collector transistor means having a base electrode, an emitter electrode, and three collector electrodes.

16. The circuit of claim 12 and further comprising unity gain transistor means having a base electrode, an emitter electrode, and a first collector electrode, the base electrode being connected to the collector electrode of said fourth transistor means, the emitter electrode being connected to the emitter electrode of said second transistor, and the first collector electrode being connected to the base electrode of said second transistor.

17. The circuit of claim 16 wherein the unity gain transistor means further includes a second collector electrode, the second collector electrode being connected to the base electrode of said unity gain transistor means.

18. The circuit of claim 12 and further comprising an RC network connected to the second terminal for applying an input signal voltage thereto.

19. The circuit of claim 12 and further comprising:

unity gain transistor means having a base electrode, an emitter electrode, and a first collector electrode, the base electrode being connected to the collector electrode of said fourth transistor means, the emitter electrode being connected to the emitter electrode of said second transistor means, and the first collector electrode being connected to the base electrode of said second transistor means, fifth and sixth transistors having their base electrodes connected to the base electrode of said second transistor and their emitter electrodes connected to the emitter electrode of said second transistor, the collector electrode of said fifth transistor connected to the base electrode of said fourth transistor means, and the collector electrode of said sixth transistor connected to the base electrode of said third transistor means, a voltage division network comprising first and second resistors connected to the first terminal for applying a reference voltage thereto, and an RC network connected to the second terminal for applying an input signal voltage thereto.

20. The circuit of claim 19 wherein said first transistor and said third and fourth transistor means are of the NPN conductivity type, and wherein said second, fifth, and sixth transistors and said unity gain transistor means are of the PNP conductivity type.

* * * * *